United States Patent
Dugar et al.

(10) Patent No.: US 12,221,329 B1
(45) Date of Patent: Feb. 11, 2025

(54) SYSTEM AND METHOD FOR MOUNTING OBJECTS ACROSS A NON-UNIFORM OUTDOOR TERRAIN

(71) Applicant: Gritt Robotics Inc., Belmont, CA (US)

(72) Inventors: Vishal Dugar, San Francisco, CA (US); Puneet Puri, San Francisco, CA (US); Anirudh Vemula, San Francisco, CA (US)

(73) Assignee: Gritt Robotics Inc., Belmont, CA (US)

( * ) Notice: Subject to any disclaimer, the term of this patent is extended or adjusted under 35 U.S.C. 154(b) by 0 days.

(21) Appl. No.: 18/799,439

(22) Filed: Aug. 9, 2024

Related U.S. Application Data

(60) Provisional application No. 63/518,473, filed on Aug. 9, 2023.

(51) Int. Cl.
 *B25J 9/16* (2006.01)
 *B66F 9/06* (2006.01)
 *B25J 5/00* (2006.01)

(52) U.S. Cl.
 CPC .............. *B66F 9/063* (2013.01); *B25J 9/162* (2013.01); *B25J 9/1633* (2013.01); *B25J 9/1646* (2013.01); *B25J 9/1666* (2013.01); *B25J 9/1687* (2013.01); *B25J 9/1697* (2013.01); *B25J 5/005* (2013.01); *B25J 9/1669* (2013.01)

(58) Field of Classification Search
 CPC ........ B25J 9/162; B25J 9/1633; B25J 9/1638; B25J 9/1646; B25J 9/1653; B25J 9/1664; B25J 9/1666; B25J 9/1669; B25J 9/1676; B25J 9/1679; B25J 9/1687; B25J 9/1697; B25J 5/00; B25J 5/005; B25J 5/007; B66F 9/063
 See application file for complete search history.

(56) References Cited

U.S. PATENT DOCUMENTS

| | | | |
|---|---|---|---|
| 2020/0350850 A1* | 11/2020 | Di Stefano | B25J 9/1687 |
| 2021/0060770 A1* | 3/2021 | Iwase | B25J 9/1633 |
| 2021/0078176 A1* | 3/2021 | Hoshiyama | B25J 9/163 |
| 2024/0051152 A1* | 2/2024 | Tadepalli | B25J 9/1679 |
| 2024/0190009 A1* | 6/2024 | Asmari | B25J 15/0616 |

FOREIGN PATENT DOCUMENTS

| | | | |
|---|---|---|---|
| CN | 117301083 A | * | 12/2023 |
| CN | 117885109 A | * | 4/2024 |
| WO | WO-2023201396 A1 | * | 10/2023 |

* cited by examiner

Primary Examiner — Spencer D Patton
(74) Attorney, Agent, or Firm — Run8 Patent Group, LLC; Peter Miller; Alexander Rodriguez

(57) ABSTRACT

A method including, at an autonomous vehicle: autonomously navigating across an outdoor terrain to locate a robotic arm and a set of objects proximal an install location; accessing an image from an optical sensor; detecting a set of install features at the install location based on the image; calculating a gross install pose of the object that locates an object proximal the install location and offset from the set of install features; defining a keep-in boundary proximal the install location and encompassing the gross install pose; autonomously navigating the robotic arm to retrieve the object from the set of objects and to locate the object in the gross install pose; detecting a series of forces applied to a distal end of the robotic arm; and navigating the object in directions of the series of forces while maintaining the object fully within the keep-in boundary.

20 Claims, 6 Drawing Sheets

SYSTEM AND METHOD FOR MOUNTING OBJECTS ACROSS A NON-UNIFORM OUTDOOR TERRAIN

CROSS-REFERENCE TO RELATED APPLICATIONS

This application claims the benefit of U.S. Provisional Application No. 63,518,473, filed on 9 Aug. 2023, which is hereby incorporated in its entirety by this reference.

TECHNICAL FIELD

This invention relates generally to the field of autonomous installation of objects onto structures and more specifically to a new and useful system and method for installing objects across a non-uniform outdoor terrain in the field of autonomous installation of objects.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
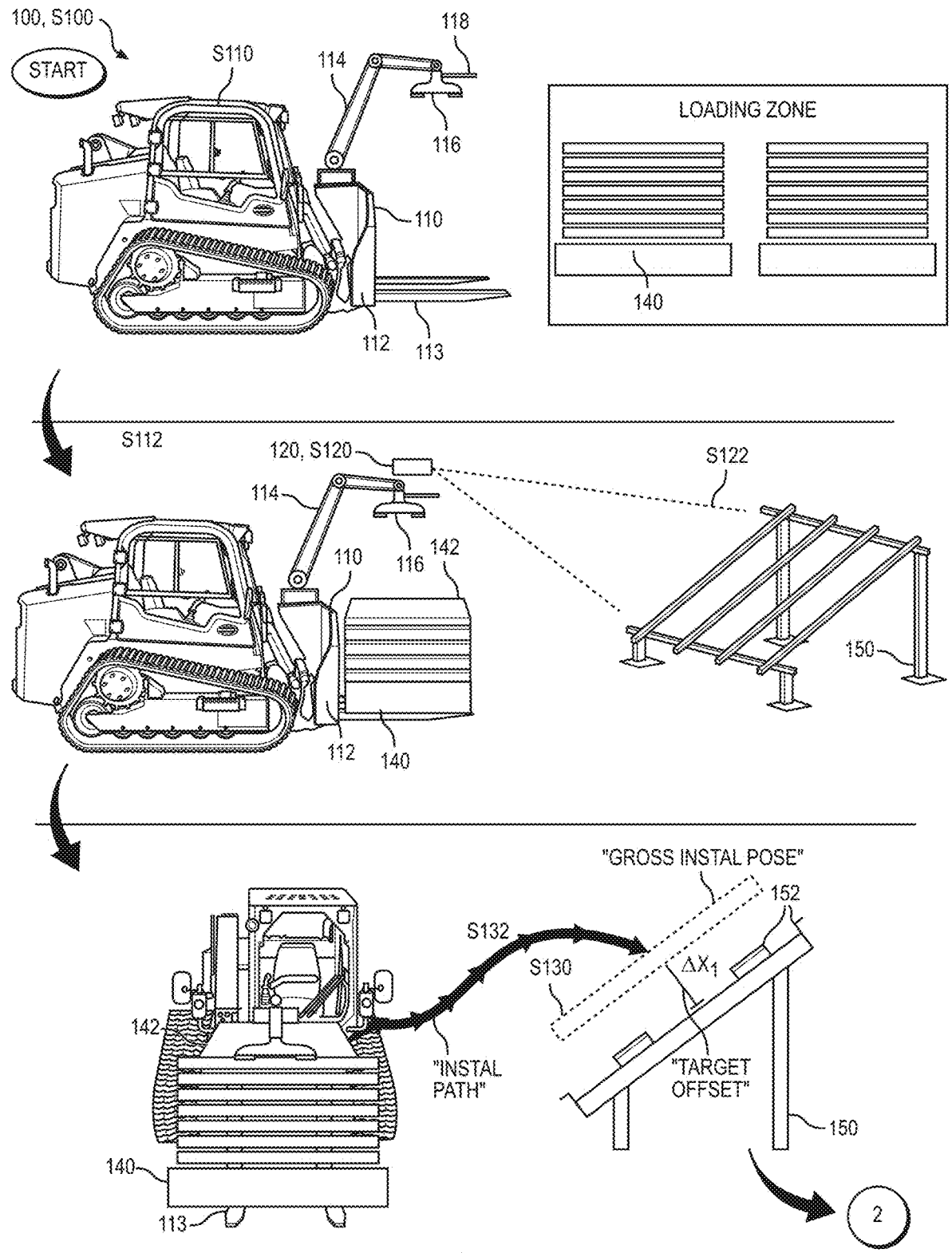
FIG. 1 is a flowchart representation of a method.
Figure 2:
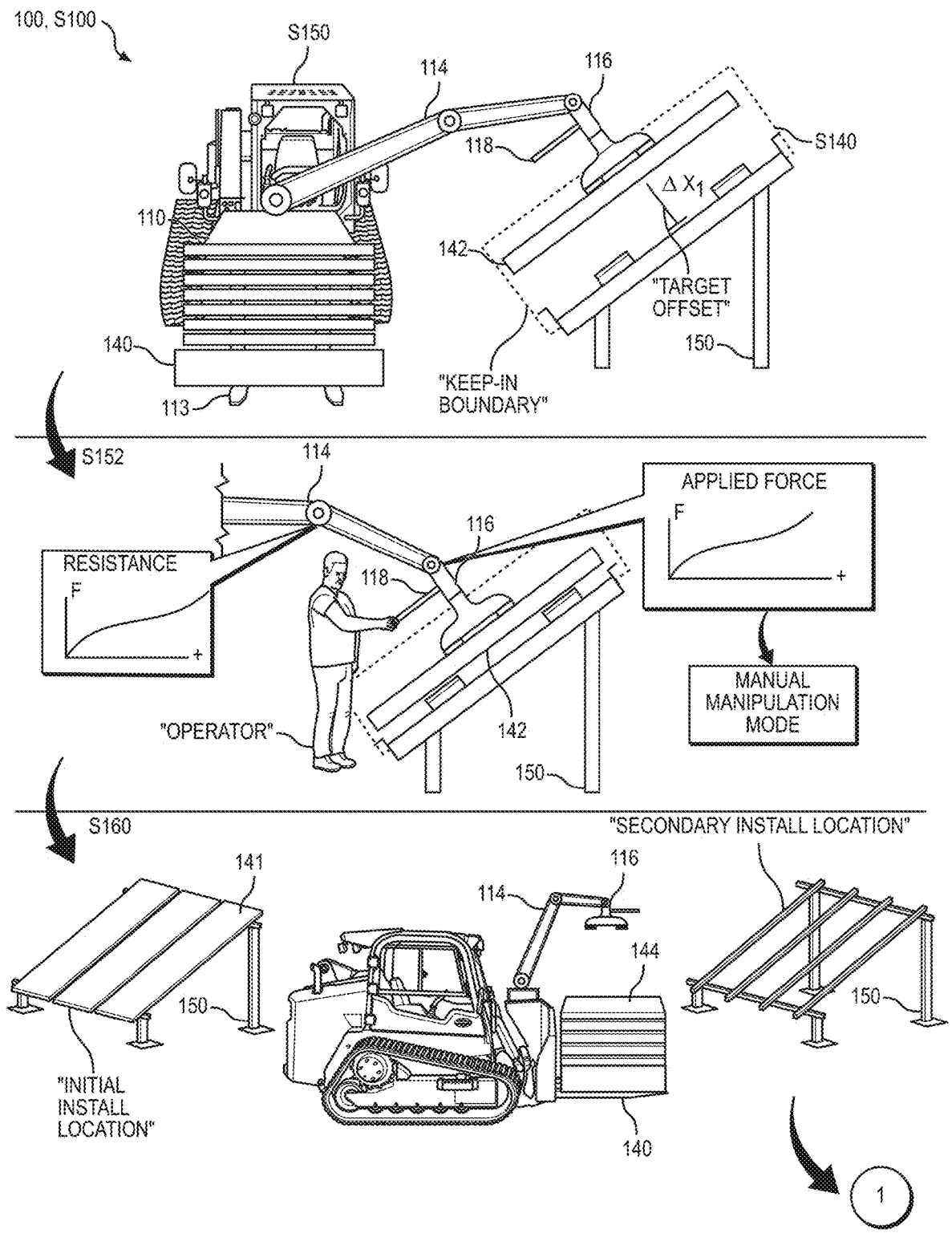
FIG. 2 is a flowchart representation of the method.
Figure 3:
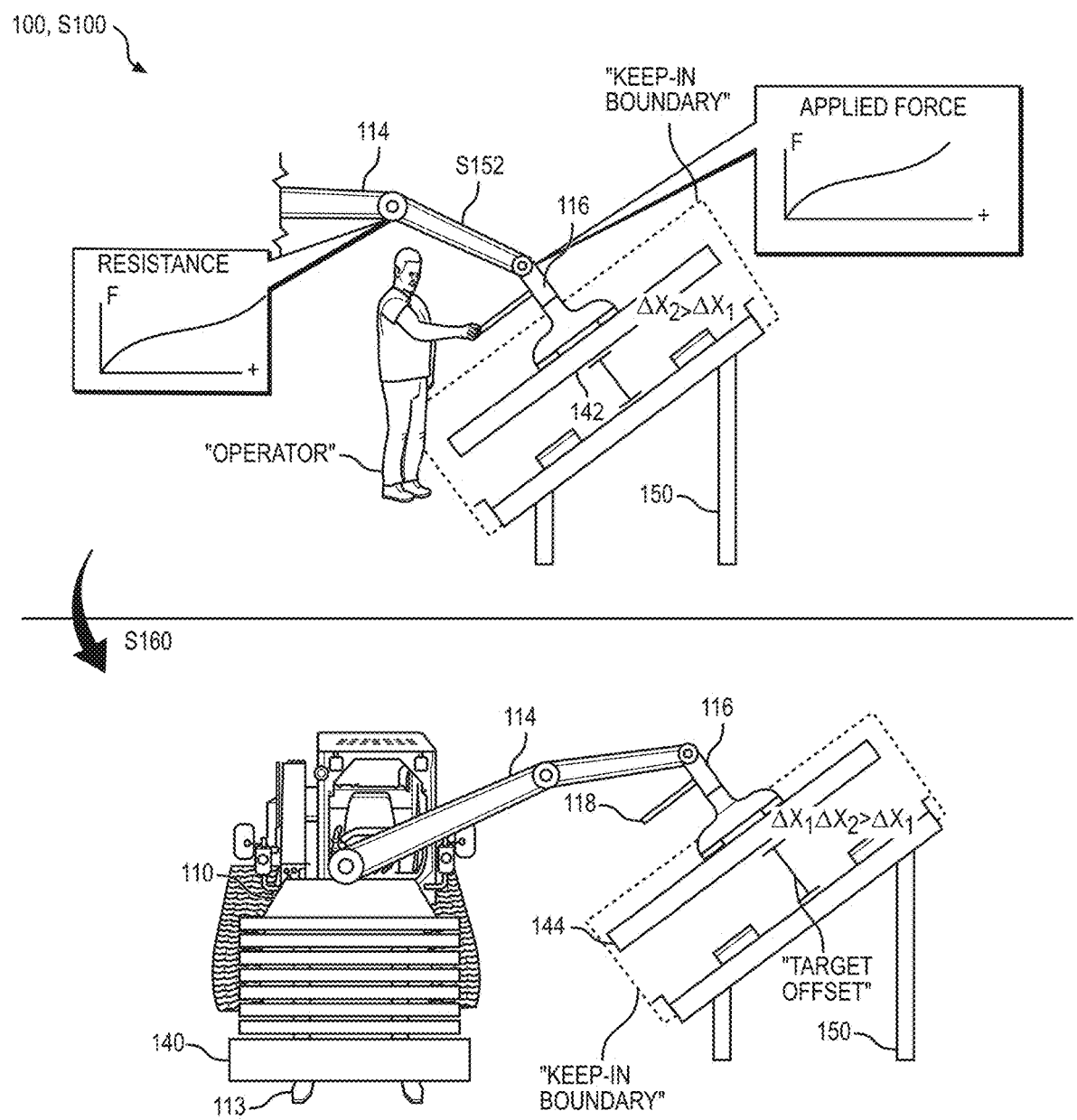
FIG. 3 is a flowchart representation of the method.
Figure 4:
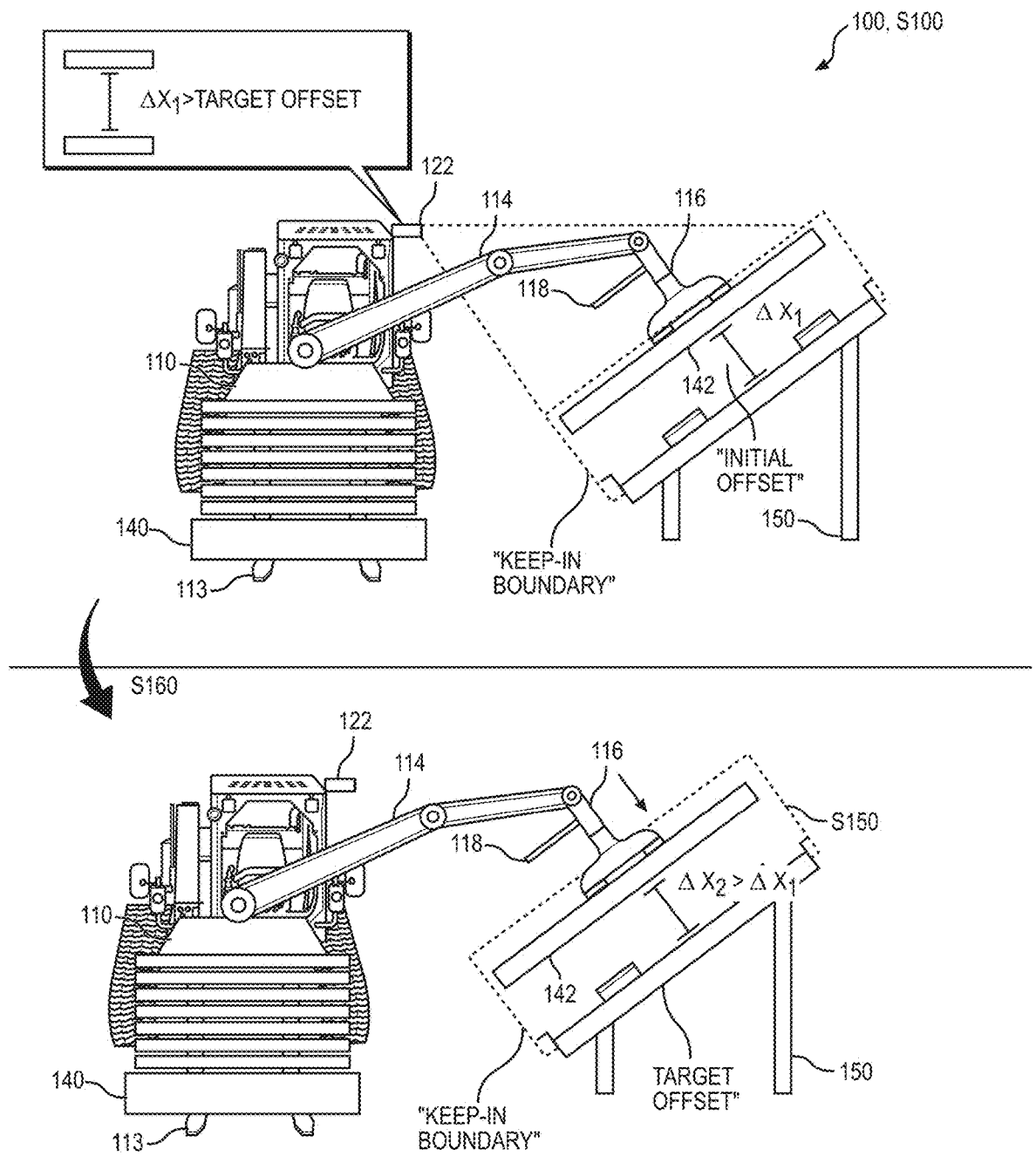
FIG. 4 is a flowchart representation of the method.
Figure 5:
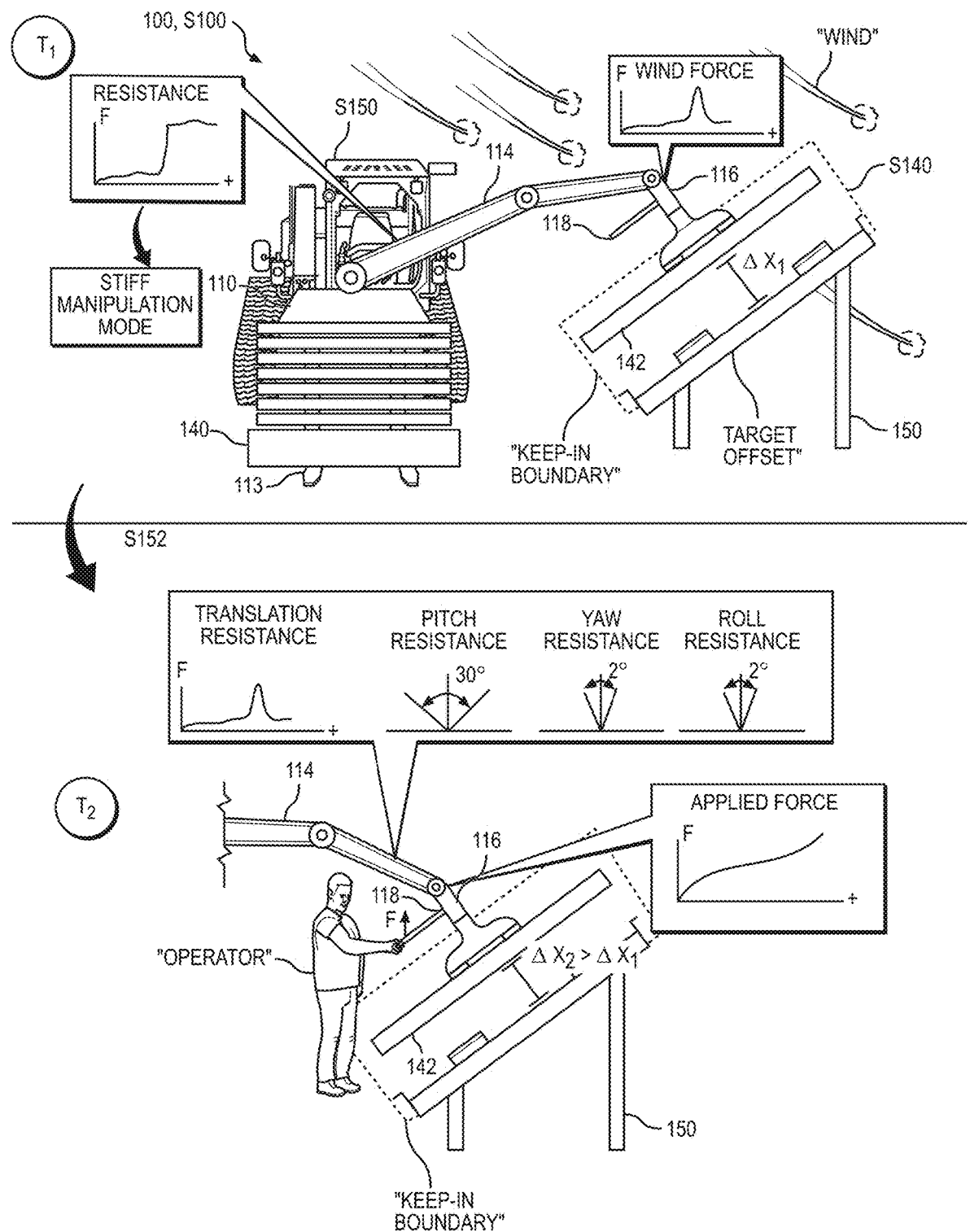
FIG. 5 is a flowchart representation of the method.
Figure 6:
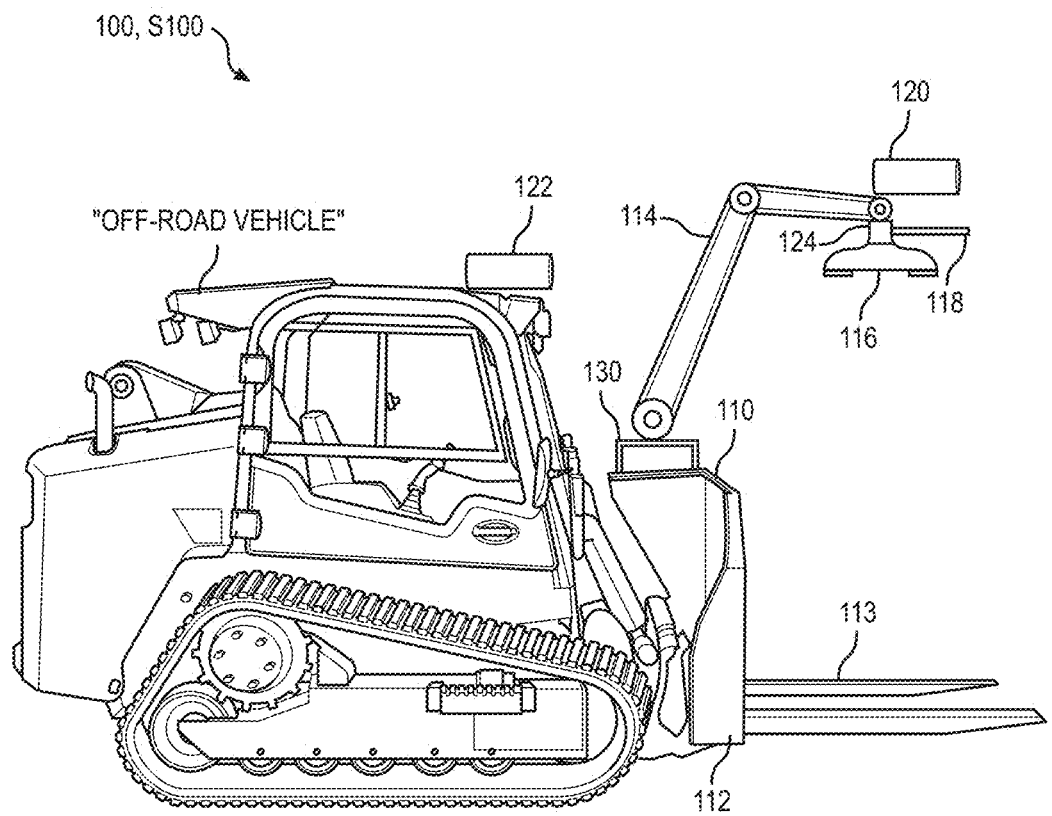
FIG. 6 is a schematic representation of a system.

As shown in FIGS. 1 and 2, a method S100 includes, at an autonomous off-road vehicle including a set of forks 113 and a robotic arm 114: autonomously loading an initial container (e.g., a pallet), containing an initial set of objects (e.g., solar panels), onto the set of forks 113 in Block S110; and autonomously navigating across a non-uniform outdoor terrain to locate the robotic arm 114 and the initial container proximal an initial install location on an initial structure in Block S112.

The method S100 further includes, prior to retrieving an initial object 142 from the initial set of objects in the initial container via the robotic arm 114: accessing an initial image from an primary optical sensor 120 defining an initial field of view intersecting the initial install location in Block S120; detecting an initial set of install features 152 at the initial install location based on the initial image in Block S122; calculating an initial gross install pose of the initial object 142 that locates the initial object 142 proximal the initial install location and offset from the initial set of install features 152 by an initial target offset distance in Block S130; and calculating an initial install path navigable by the robotic arm 114 to retrieve the initial object 142 from the initial set of objects in the initial container and to maneuver the initial object 142 to the initial gross install pose in Block S132.

The method S100 also includes, in Block S140, defining an initial keep-in boundary of the initial object 142 maintained by the robotic arm 114. The initial keep-in boundary is arranged proximal the initial install location and encompassing the initial gross install pose.

The method S100 further includes, at the autonomous off-road vehicle: autonomously navigating the robotic arm 114 according to the initial install path to retrieve the initial object 142 from the initial set of objects in the initial container and to locate the initial object 142 in the initial gross install pose in Block S150; and, following completion of the initial install path by the robotic arm 114, entering a manual manipulation mode in Block S152. The method S100 also includes, in the manual manipulation mode: detecting an initial series of forces applied to a distal end of the robotic arm 114; and navigating the initial object 142 in directions of the initial series of forces while supporting a weight of the initial object 142 and maintaining the initial object 142 fully within the initial keep-in boundary.

The method S100 further includes, in Block S160 following installation of the initial object 142 at the initial install location, autonomously navigating across the non-uniform outdoor terrain to locate the robotic arm 114 and the initial container proximal a secondary install location on the initial structure.

2. Applications

Generally, Blocks of the method S100 can be executed by a robotic system 100 in cooperation with an off-road vehicle (e.g., skid steer loader) to: maneuver a primary container 140 (e.g., a pallet), containing a set of objects (e.g., solar panels, solar trackers), loaded onto the off-road vehicle (e.g., loaded onto a set of forks 113) across a non-uniform outdoor terrain (e.g., uneven muddy terrain); and support an operator during installation of these objects at a structure 150 arranged across the outdoor terrain.

More specifically, the system 100 can: maneuver across the non-uniform outdoor environment to locate a robotic arm 114—coupled to the off-road vehicle—proximal an initial install location, such as proximal a structure 150 arranged across the outdoor terrain; retrieve an initial object 142 from the primary container 140 (e.g., pallet of solar panels, pallet of solar trackers) loaded onto the off-road vehicle; locate this initial object 142 at a gross install pose proximal the initial install location at the structure 150 (e.g., solar panel rails, piles). Furthermore, the system 100 can then support a weight of the initial object 142 while maintaining the initial object 142 within a boundary proximal the initial install location to prevent collisions of the initial object 142 to adjacent objects installed on the structure 150 and prevent movement of the robotic arm 114 from application of local wind loads at the outdoor environment during installation of the initial object 142 to the initial install location by an operator.

The system 100 can include an attachment assembly 110 including: an attachment housing 112; a set of forks 113 (e.g., pallet fork, utility forks) extending from the attachment housing 112 and configured to receive loading of a primary container 140 (e.g., pallet of solar panels); and a robotic arm 114 coupled to the attachment housing 112 and configured to retrieve objects from the primary container 140 (e.g., pallet of solar panels) loaded onto the set of forks 113. In one example, the system 100 can include the attachment assembly 110 integrated directly onto the off-road vehicle (e.g., skid steer loader) or the attachment assembly 110 configured to transiently couple to an existing off-road vehicle (e.g., skid steer loader). Additionally, the system 100 can also include a suite of sensors—such as optical sensors (e.g., color cameras, infrared cameras), proximity sensors (e.g., ultrasonic sensors, light detection and ranging sensors), position modules (e.g., global position modules), force sensors 124—integrated into the attachment assembly 110 and/or arranged on the off-road vehicle separate from the attachment assembly 110.

In one example, the system 100 can: navigate the off-road vehicle (e.g., skid steer loader) across a non-uniform outdoor terrain to deliver a primary container 140 (e.g., pallet of solar panels) proximal an initial install location at the outdoor environment; and access an image from a primary optical sensor 120—such as coupled to the robotic arm 114 and/or coupled to a chassis of the off-road vehicle-defining a field of view intersecting the initial install location. The system 100 can then implement computer vision techniques (e.g., object detection, feature extraction) to: detect a set of initial install features (e.g., brackets) on the initial install location represented in the image; and calculate a gross install pose proximal the initial install location defining a target offset distance (e.g., six inches) between an initial object 142 and the set of initial install features.

Accordingly, the system 100 can then: implement path planning techniques (e.g., graph-based path planning, sampling-based path planning) to calculate an install path to maneuver the initial object 142 to the gross install pose; and trigger the robotic arm 114 to retrieve the initial object 142 from the primary container 140 (e.g., pallet of solar panels) and to maneuver the initial object 142 along the install path to locate the initial object 142 at the gross install pose. The system 100 can then, responsive to application of forces at a distal end of the robotic arm 114 (e.g., control handle 118 coupled to end effector 116), trigger operation of the robotic arm 114 in the manual manipulation mode to enable the operator to manually control the initial object 142 (e.g., solar panel), during installation of the initial object 142 to the initial install location by the operator, while supporting the initial object 142 (e.g., solar panel).

Therefore, the system 100 can: deliver a primary container 140 according to a site plan (e.g., solar farm site plan) across a non-uniform outdoor terrain to deliver the primary container 140 to a designated installation zone; and support an operator by enabling manual control (e.g., lift, translate) of these objects retrieved from the primary container 140—loaded onto the off-road vehicle—during installation onto an initial install location.

2.1 Applications: Keep-In Boundary

The system 100 can further define a keep-in boundary (e.g., three-dimensional boundary) of the initial object 142 maintained proximal the initial install location by the robotic arm 114. More specifically, the system 100 can define the keep-in boundary to: define positional tolerances of the initial object 142 proximal the install location; prevent collisions of the initial object 142 to structural elements (e.g., installation features) proximal the install features at the install location at the structure 150 and/or adjacent objects (e.g., adjacent solar panels) installed at the structure 150; prevent sudden movement of the initial object 142 such as, from wind loads applied to the robotic arm 114 at the outdoor environment; and enable an operator to manually navigate the initial object 142 within the keep-in boundary during installation of the initial object 142 at the install location by the operator.

In one example the system 100 can: access an image from a primary optical sensor 120 defining a field of view intersecting the installation location; and implement computer vision techniques to, detect a secondary object 144 adjacent the install location and derive an install plane (e.g., rectangular plane) at the install location. The system 100 can then define a keep-in boundary (e.g., three-dimensional boundary) that:

encompasses the gross install pose; defines an interstice between a lateral side of the secondary object 144 and a periphery of the keep-in boundary; and extending below the install plane at the install location. During installation of the initial object 142 at the install location, local winds at the outdoor environment can apply wind loads to the initial object 142 supported by the robotic arm 114 proximal the install location which can result in sudden movements (e.g., jerk) of the initial object 142 away from the install location and collisions with proximal structural elements at the install location. Accordingly, the system 100 can apply positional tolerances and manipulation resistances, such as by applying braking forces to joints of the robotic arm 114 and/or locking joints of the to the robotic arm 114, to prevent the initial object 142—supported on the robotic arm 114—from breaching the keep-in boundary.

Therefore, during an installation routine of an initial object 142 to an install location, the system 100 retain the initial object 142 proximal an install location and entirely within a keep-in boundary regardless of environmental wind conditions proximal the install location.

3. System

In one implementation, the system 100 can include an attachment assembly 110 including: an attachment housing 112 (or "chassis") coupled (e.g., via welding, brackets) to an off-road vehicle (e.g., skid steer loader); a set of forks 113 (e.g., pallet fork, utility forks) extending from the attachment housing 112 and configured to receive loading of a primary container 140 (e.g., pallet of solar panels); a robotic arm 114 (e.g., articulated robotic arm 114) coupled to the attachment housing 112; an end effector 116 (e.g., vacuum gripper) coupled to a distal end of the robotic arm 114 and configured to retrieve objects (e.g., solar panels) from the primary container 140 (e.g., pallet of solar panels) loaded onto the set of forks 113; a power source (e.g., generator) configured to supply power to the robotic arm 114, the end effector 116, and the set of forks 113; and a controller 130 configured to execute controls to maneuver the robotic arm 114, such as by retrieving an initial object 142 from the primary container 140 (e.g., pallet of solar panels) and locating the initial object 142 proximal an initial install location.

In one example, the system 100 can include the attachment assembly 110 integrated into a fully autonomous off-road vehicle (e.g., skid steer loader). In this example, the autonomous off-road vehicle can autonomously: load a primary container 140 onto the set of forks 113; and navigate across the non-uniform outdoor terrain to locate the primary container 140 proximal an initial install location.

In another example, the attachment assembly 110 is configured to couple to a manually operated off-road vehicle. In this example, an operator can manually control the off-road vehicle to: load a primary container 140 onto the set of forks 113; and navigate across the non-uniform outdoor terrain to locate the primary container 140 proximal the initial install location.

Therefore, the system 100 can: navigate across a non-uniform outdoor terrain to deliver a primary container 140 (e.g., pallet of solar panels), such as to designated installation zones of a site plan; via the robotic arm 114; retrieve an initial object 142 from the primary container 140 loaded on the set of forks 113; and maneuver the initial object 142 (i.e., about the outdoor environment) to locate the initial object 142 proximal an initial install location.

3.1 Sensors

In one implementation, the system 100 can include a suite of sensors, such as optical sensors (e.g., color cameras, infrared cameras), proximity sensors (e.g., ultrasonic sensors, light detection and ranging sensors), position modules (e.g., global position modules), force sensors 124, etc. The suite of sensors can be coupled to the attachment assembly 110 and/or arranged about a chassis of the off-road vehicle (e.g., skid-steer loader). For example, the system 100 can include: a primary optical sensor 120 integrated into the robotic arm 114 (e.g., coupled to an end effector 116) and defining a primary field of view of an initial install location; and secondary optical sensor 122 arranged on an exterior (e.g., chassis) of the off-road vehicle and defining a secondary field of view, different from the primary field of view, of the initial install location. During maneuver of an initial object 142 by the robotic arm 114, the initial object 142 can obfuscate the primary field of view of the initial install location thereby degrading image data capture during installation of the initial object 142 onto the initial install location. Thus, the system 100 can leverage image data from the secondary optical sensor 122 to redress the degraded image data captured from the primary optical sensor 120.

3.2 Control Handle

In one implementation, the system 100 can operate the robotic arm 114 in a manual manipulation mode (or "zero-gravity mode") to permit the operator to manually maneuver the initial object 142—grasped by the end effector 116—during installation of the initial object 142 onto the initial install location by the operator. In this implementation, the system 100 can further include a control handle 118 (or "teach handle") extending from the end effector 116; and a force sensor 124 coupled to the control handle 118.

During installation of the initial object 142 at the initial install location, the operator can apply a force (e.g., push, pull) at the control handle 118 to transition the robotic arm 114 into the manual manipulation mode. More specifically, the system 100 can: access a sequence of force values from the force sensor 124 coupled to the control handle 118; detect the sequence of force values exceeding (e.g., greater than five pounds-force) a threshold force value (e.g., 10 pounds-force); and, in response to the sequence of force values exceeding the threshold force value, trigger the robotic arm 114 in the manual manipulation mode by releasing joints of the robotic arm 114 to permit manual motion control of the initial object 142 by the operator while supporting the initial object 142.

Alternatively, the operator can apply a force (e.g., push, pull) directly to the initial object 142 supported on the robotic arm 114 to transition the robotic arm 114 into the manual manipulation mode. In this implementation, the system 100 can: access a sequence of force values from a force sensor 124 integrated into the end effector 116 of the robotic arm 114; detect the sequence of force values exceeding (e.g., greater than five pounds-force) a threshold force value (e.g., 10 pounds-force); and, in response to the sequence of force values exceeding the threshold force value, trigger the robotic arm 114 in the manual manipulation mode by releasing joints of the robotic arm 114 to permit manual motion control of the initial object 142 by the operator while supporting the initial object 142. Thus, the operator can navigate the initial object 142 by: applying forces directly to the initial object 142 supported on the robotic arm 114; and/or applying forces to the control handle 118 coupled to the robotic arm 114.

Therefore, the system 100 can support an operator by permitting the operator to manually control the initial object 142—grasped by the end effector 116—during installation of an initial object 142 to an initial install location.

4. Pallet Loading

Block S110 of the method S100 recites, at an autonomous off-road vehicle including a set of forks 113 and a robotic arm 114, autonomously loading an initial container, containing an initial set of objects, onto the set of forks 113 in Block S110. Generally, the system 100 can load a primary container 140 (e.g., pallet of solar panels) onto the set of forks 113 in preparation for delivery of the primary container 140 to a designated installation zone such as, defined in a site map.

In one implementation, the system 100 can autonomously load a primary container 140 onto the set of forks 113. In this implementation, the system 100 can: access a site plan (e.g., solar farm site plan) representing a map of a non-uniform outdoor terrain; identify a primary location of a loading zone defined in the site plan; and autonomously navigate the off-road vehicle—and therefore the attachment assembly 110—across the non-uniform outdoor terrain to the loading zone. Accordingly, the system 100 can then: identify (e.g., via tags) a primary container 140 (e.g., pallet of solar panels) at the loading zone corresponding to an initial installation zone located at the non-uniform outdoor terrain; and implement closed-loop controls to autonomously load the primary container 140 onto the set of forks 113.

In another implementation, an operator can manually control the system 100 to maneuver the off-road vehicle across the non-uniform outdoor terrain to the loading zone. The operator can then, manipulate controls (e.g., fork controls)—such as at a loading interface (e.g., joystick, buttons)—arranged at or integrated into the off-road vehicle to load the primary container 140 at the loading zone onto the set of forks 113.

In one example, prior to loading the primary container 140, the system 100 can: autonomously navigate the off-road vehicle to a loading zone at the non-uniform outdoor terrain; access an image from a secondary optical sensor 122 arranged on the autonomous off-road vehicle and defining a field of view intersecting the primary container 140 arranged at the loading zone; implement computer vision techniques to detect a set of loading features at the primary container 140 in the image; and calculate a loading path navigable by the autonomous off-road vehicle to locate the autonomous off-road vehicle proximal the primary container 140 and to couple the set of forks 113 to the set of loading features. The system 100 can then autonomously navigate the autonomous off-road vehicle according to the loading path to load the primary container 140, containing the set of objects, onto the set of forks 113.

Therefore, prior to an installation routine, the system 100 can autonomously load a primary container 140 (e.g., pallet of solar panels) in preparation to deliver the primary container 140 to a designated installation zone of a site plan representing a non-uniform outdoor terrain.

5. Outdoor Navigation+Installation Location

Block S112 of the method S100 recites, at an autonomous off-road vehicle including a set of forks 113 and a robotic arm 114, autonomously loading an initial container, autonomously navigating across a non-uniform outdoor terrain to locate the robotic arm 114 and the initial container proximal an initial install location on an initial structure.

Generally, the system 100 can: following loading of a primary container 140 (e.g., pallet of solar panels) onto a set of forks 113 at a loading zone, navigate the off-road vehicle—and therefore the primary container 140—across a non-uniform outdoor terrain to deliver the primary container 140 to an initial installation zone at an outdoor environment; and maneuver the robotic arm 114 proximal an initial install location at a structure 150 arranged at the initial installation zone.

In one implementation, the system 100 can implement a path planning model (e.g., artificial intelligence path planning model) to identify a target sequence of install locations across the outdoor environment, such as based on: a site plan (e.g., solar farm site plan) representing the outdoor environment; availability of materials (e.g., solar panels) scheduled for installation across the outdoor environment; and current and/or predicted weather conditions of the outdoor environment.

In one implementation, as described above, the system 100 can: access a site plan (e.g., solar farm site plan) representing a map of a non-uniform outdoor terrain; identify an initial installation zone, in the site plan, corresponding to a primary container 140 (e.g., pallet of solar panels) currently loaded onto the set of forks 113; and trigger the off-road vehicle to autonomously maneuver the non-uniform outdoor terrain to deliver the primary container 140 to the initial installation zone. Additionally, the system 100 can then: extract a geospatial location of a primary install location of an initial structure at the initial installation zone from the site plan; trigger the off-road vehicle to automatically maneuver across the non-uniform outdoor terrain to locate the robotic arm 114 proximal the primary install location in preparation for an initial object 142 installation routine. Additionally, the system 100 can leverage data accessed from the suite of sensors to autonomously and locally maneuver the system 100 about the primary installation zone—such as via closed-loop controls—to locate the robotic arm 114 proximal the initial install location at the initial installation zone.

In another implementation, an operator can manually control the system 100 to maneuver the off-road vehicle in order to locate the robotic arm 114 proximal the initial install location at the structure 150.

Therefore, in preparation for an initial object 142 installation routine, the system 100 can deliver a primary container 140 (e.g., pallet of solar panels) across non-uniform outdoor terrain in order to locate the primary container 140 proximal an initial install location of an initial installation zone.

The system 100 can then repeat the steps described above to maneuver the off-road vehicle—and therefore the attachment assembly 110—across a set of install locations arranged on a non-uniform outdoor terrain.

6. Gross Install Pose

Blocks of the Method S100 recite, prior to retrieving an initial object 142 from the initial set of objects in the initial container via the robotic arm 114: accessing an initial image from an primary optical sensor 120 defining an initial field of view intersecting the initial install location in Block S120; detecting an initial set of install features 152 at the initial install location based on the initial image in Block S122; calculating an initial gross install pose of the initial object 142 that locates the initial object 142 proximal the initial install location and offset from the initial set of install features 152 by an initial target offset distance in Block S130; and calculating an initial install path navigable by the robotic arm 114 to retrieve the initial object 142 from the initial set of objects in the initial container and to maneuver the initial object 142 to the initial gross install pose in Block S132.

Generally, the system 100 can: access an initial image (e.g., color image) from a primary optical sensor 120 depicting the initial install location at a structure 150; detect an installation feature (e.g., clamp) arranged at the initial install location; derive a gross install pose that is proximal the initial install location and offset from the initial install features by a target offset distance; and derive an install path to maneuver a primary object from the primary container 140—loaded onto the set of forks 113—to the gross install pose offset from the installation feature at the initial install location.

In one implementation, the system 100 can: access a baseline offset between an initial object 142 and a set of initial install features arranged on the initial install location; access a template set of install features 152, such as by accessing a virtual model representing the install features from local memory and/or from a remote computer system 100; capture an initial image at a primary optical sensor 120 defining a field of view of the initial install location on the structure 150; implement computer vision techniques (e.g., template matching, object detection) to extract a set of visual features from the initial image; and identify presence of an initial set of install features 152 at the initial install location based on the set of visual features and the template set of install features 152. The system 100 can then: access a baseline offset between the primary object and the set of initial install features at the initial install location; and calculate a gross install pose proximal the initial install location based on the baseline offset and the initial set of install features 152.

For example, the system 100 can implement photogrammetry techniques (e.g., stereophotogrammetry, depth perception) to derive a geospatial position of the initial set of install features 152 at the initial install location. Accordingly, the system 100 can then calculate the gross install pose defining a target offset between the initial object 142 and the set of initial install features based on the geospatial position of the initial set of install features 152 and the baseline offset.

Therefore, the system 100 can calculate a gross install pose of an initial object 142 as offset from install features at the initial install location, thereby enabling an operator proximal the initial install location to observe an interstice between the initial object 142 and the initial set of install features 152 during installation of the initial object 142 at the initial install location.

6.1 Calculating Install Path

In one implementation, the system 100 can further calculate an install path to maneuver the initial object 142 from the primary container 140 (e.g., pallet of solar panels)—loaded onto the set of forks 113—to the gross install pose proximal the initial install location. In this implementation, the system 100 can: access a template pose defining the gross install pose of the initial object 142, such as by accessing a virtual model of the initial object 142 defining the gross install pose from internal memory or accessing the virtual model of the initial object 142 from a remote computer system 100; access an image from a primary optical sensor 120 defining a field of view intersecting the primary container 140 loaded onto the set of forks 113; extract a set of visual features from the image depicting the initial object 142 arranged on the primary container 140; and derive an initial pose of the initial object 142 based on the set of visual features. Accordingly, the system 100 can then implement path planning techniques (e.g., graph-based path planning, sampling-based path planning) to calculate an install path to maneuver the initial object 142 to the target gross install pose according to the template pose and the initial pose.

Therefore, the system 100 can calculate an install path to maneuver an initial object 142 about an outdoor environment from the primary container 140—loaded onto the set of forks 113—to the gross install pose at the initial install location.

6.2 Adjusting Offset Distance

In one implementation, following maneuver of the initial object 142 to the gross install pose, the system 100 can validate positioning of the initial object 142 at the gross install pose. In this implementation, the initial object 142 grasped by the robotic arm 114 can obfuscate a primary field of view of the initial install location captured by a primary optical sensor 120 arranged on the robotic arm 114. Accordingly, the system 100 can alternatively access an image from a secondary optical sensor 122 arranged on the chassis of the off-road vehicle and defining a secondary field of view of the initial install location. The system 100 can then: extract a set of visual features from the image; derive an offset distance between the initial object 142 and the set of initial install features at the initial install location; and, in response to the offset distance deviating from a target offset distance between the initial object 142 and the set of initial install features, trigger the robotic arm 114 to locate the initial object 142 at the target offset distance from the set of initial install features.

Therefore, the system 100 can leverage multiple fields of view of optical sensors coupled to the off-road vehicle and/or coupled to the attachment assembly 110 to increase image resolution and position resolution during an installation routine and thus, validate positioning of the initial object 142 at the gross install pose proximal the initial install location.

7. Object Retrieval

Blocks of the Method S100 recite, at the autonomous off-road vehicle: autonomously navigating the robotic arm 114 according to the initial install path to retrieve the initial object 142 from the initial set of objects in the initial container and to locate the initial object 142 in the initial gross install pose in Block S150; and, following completion of the initial install path by the robotic arm 114, entering a manual manipulation mode in Block S152. Generally, the system 100 can: trigger the robotic arm 114 to locate an end effector 116 (e.g., gripper) proximal an initial object 142 arranged on the primary container 140; trigger the end effector 116 to grasp the initial object 142 from the primary container 140; and trigger the robotic arm 114 to maneuver the initial object 142 along the install path from the primary container 140—arranged on the set of forks 113—to the gross install pose proximal the initial install location.

7.1 Install Path+Stiff Manipulation Mode

In one implementation, the system 100 can navigate the robotic arm 114 according to the install path to: retrieve the initial object 142 from the set of objects within the primary container 140; and locate the initial object 142 in the initial gross install pose proximal the initial install location. Additionally, subsequent to locating the initial object 142 at the initial gross install pose, the system 100 can then enter a stiff manipulation mode such as, by applying a brake to joints of the robotic arm 114 to lock movement of the robotic arm 114, to restrict movement of the initial object 142 while supporting the weight of the initial object 142 and maintaining the initial object 142 fully within the keep-in boundary. Therefore, during time periods of local wind at the initial install location, the system 100 can maintain the initial object 142 proximal the initial install location.

7.2 Object Orientation

In one implementation, the system 100 can trigger the robotic arm 114 to locate the initial object 142 in a target orientation at the initial install location. In this implementation, the system 100 can, as described above, trigger the robotic arm 114 to: retrieve the initial object 142 from the primary container 140 loaded onto the set of forks 113; and execute a primary install path to locate the initial object 142 at the gross install pose proximal the initial install location. In this implementation, following location of the initial object 142 at the gross install pose, the system 100 can: access an image from a primary optical sensor 120 defining a field of view intersecting the initial object 142 arranged proximal the initial install location; extract a set of visual features from the image; and derive an initial orientation of the initial object 142 proximal the initial install location based on the set of visual features.

The system 100 can then, in response to the initial orientation of the initial object 142 deviating from a target orientation, trigger the robotic arm 114 to unload the initial object 142 onto the primary container 140. More specifically, the system 100 can implement the install path to maneuver the initial object 142 from the gross install pose back to the primary container 140 loaded onto the set of forks 113. Thus, following unloading of the initial object 142 onto the primary container 140, the system 100 can then implement the steps described above to calculate a secondary install path, different from the primary install path, to maneuver the initial object 142 to the gross install pose according to the target orientation. The system 100 can then trigger the robotic arm 114 to retrieve the initial object 142 from the primary container 140 and to maneuver the initial object 142 along this secondary path to locate the initial object 142 in the target orientation at the gross install pose.

For example, during installation of a solar panel onto a structure 150, the system 100 can implement the steps described above to verify a polarity of the solar panel proximal the install location. Accordingly, in response to detecting the polarity of the solar panel as deviating from a target polarity, the system 100 can: unload the solar panel onto the primary container 140 at the off-road vehicle; and trigger the robotic arm 114 to then retrieve the solar panel from the primary container 140 and locate the solar panel at the install location according to the target polarity.

Therefore, the system 100 can repeat the steps described above to locate the initial object 142 in a target orientation at an initial install location during an installation routine.

8. Manual Manipulation Mode

Block S140 of the method S100 recites defining an initial keep-in boundary of the initial object 142 maintained by the robotic arm 114. The initial keep-in boundary is arranged proximal the initial install location and encompassing the initial gross install pose. Generally, the system 100 can: define a geospatial boundary (e.g., sphere, cube) proximal the initial install location and encompassing the gross install pose; and responsive to application of forces at the distal end of the robotic arm 114, initialize operation the robotic arm 114 in a manual manipulation mode (or "zero-gravity mode")—within the keep-in boundary—to enable an operator to manually maneuver the initial object 142 during installation of the initial object 142 to the initial install location by the operator.

8.1 Keep-In Boundary

In one implementation, the system 100 can: access an initial keep-in boundary, such as from local memory or from a remote computer system 100; and following location of the initial object 142 at the gross install pose, project the keep-in boundary onto a spatial representation (e.g., virtual model) of the initial install location. In one example, the system 100 can align a center of mass of the keep-in boundary to the gross install pose proximal the initial install location. In another example, the system 100 can align the keep-in boundary to the initial install features at the initial install location. In this implementation, the system 100 can trigger operation of the robotic arm 114 in the manual manipulation mode while the initial object 142 remains within the keep-in boundary. Alternatively, in response to the initial object 142 exiting the keep-in boundary, the system 100 can terminate operation of the robotic arm 114 in the manual manipulation mode to prevent an operator from maneuvering the initial object 142 away from the initial install location.

In another implementation, the system 100 can derive the keep-in boundary based on a geometry of the initial object 142 at the gross install pose. In this implementation, the system 100 can: access an image from a primary optical sensor 120 defining a field of view intersecting the initial object 142 arranged at the initial install location; extract a set of visual features from the image; derive a geometry of the initial object 142 based on the set of features; and generate the keep-in boundary based on the geometry of the initial object 142. For example, the system 100 can: generate a three-dimensional boundary approximating a geometry of the initial object 142; and scale this three-dimensional boundary, such as by a scalar coefficient (e.g., 1.05), to define the keep-in boundary.

Therefore, the system 100 can define a boundary for operation of the robotic arm 114 in the manual manipulation mode to: enable an operator to manually maneuver the initial object 142 proximal the initial install location during an installation routine; and prevent an operator from maneuvering the initial object 142 away from the initial install location.

8.2 Contextual Boundary+Collision Avoidance

In one implementation, during navigation of the initial object 142—such as by an operator maneuvering the initial object 142 via the control handle 118—proximal the initial install location, the system 100 can: access an image from the primary optical sensor 120 defining the field of view intersecting the initial install location; detect structural features adjacent the initial install location which can collide with the initial object 142; and define a keep-in boundary to prevent collision of the initial object 142 to adjacent structural elements (e.g., solar panels, installation features) at the initial install location.

For example, the system 100 can: access an image from a primary optical sensor 120 defining the field of view intersecting the initial install location; and implement computer vision techniques to detect a secondary object 144 (e.g., solar panel) arranged adjacent the initial install location and detect an install plane (e.g., rectangular plane) encompassed by the set of initial install features at the initial install location. The system 100 can then define the keep-in boundary to: encompass the gross install pose; define an interstice between a lateral side of the secondary object 144 and a periphery of the keep-in boundary; constrained within the set of initial install features; and extending below the install plane at the initial install location.

Therefore, during navigation of the initial object 142 within the keep-in boundary, the system 100 can restrict navigation of the initial object 142 according to the keep-in boundary to prevent the initial object 142 from breaching the keep-in boundary and colliding with adjacent structural elements (e.g., the secondary object 144, the set of initial install features).

The system 100 can then repeat these steps across subsequent installation of objects across a set of install locations at the structure 150.

8.3 Initializing Manipulation Mode

In one implementation, the system 100 can detect presence of an operator proximal the initial install location at the structure 150, such as by detecting presence of the operator in an image captured from a primary optical sensor 120 defining a field of view of the initial install location. The system 100 can then trigger the robotic arm 114 to retrieve the initial object 142 from the primary container 140 loaded onto the set of forks 113; maneuver the initial object 142 along the install path to locate the initial object 142 at the gross install pose; and locate the control handle 118, coupled to an end effector 116 of the robotic arm 114, proximal the operator.

In this implementation, following location of the initial object 142 at the gross install pose proximal the initial install location, the system 100 can then enter a manipulation mode of the initial object 142. For example, the system 100 can: receive application of a force (e.g., pull force) at the control handle 118 extending from the end effector 116; read a sequence of force values from a force sensor 124 coupled to the control handle 118; detect a ramp rate in the sequence of force values and, in response to the ramp rate of the sequence of force values exceeding a threshold ramp rate, trigger operation of the robotic arm 114 in a stiff manipulation mode by locking and/or braking joints of the robotic arm 114 to restrict motion control of the initial object 142 by the operator while supporting the initial object 142 within the keep-in boundary. In another example, in response to the ramp rate of the sequence of force values falling below a threshold ramp rate, the system 100 can trigger operation of the robotic arm 114 in a manual manipulation mode by releasing joints of the robotic arm 114 to enable motion control of the initial object 142 by the operator while supporting the initial object 142 within the keep-in boundary.

In another implementation, following location of the initial object 142 at the gross install pose proximal the initial install location, the system 100 can: detect presence of the operator proximal the initial install location as described above; and trigger rotation of the end effector 116 to align the control handle 118 with the operator. The system 100 can then, as described above, trigger operation of the robotic arm 114 in the manual manipulation mode responsive to applied forces at the distal end of the robotic arm 114 (i.e., at the control handle 118).

Therefore, the system 100 can operate the robotic arm 114 in a manual manipulation mode within a keep-in boundary to enable an operator to manually maneuver the initial object 142 during installation of the initial object 142 to the initial install location by the operator.

8.4 Manipulation Resistance

Generally, in the manual manipulation mode, the system 100 can apply a manipulation resistance (e.g., translational manipulation resistance, rotational manipulation resistance) to the robotic arm 114 to maintain the initial object 142—supported at the distal end of the robotic arm 114—entirely within the keep-in boundary during installation of the initial object 142 at the initial install location by an operator. More specifically, the system 100 can trigger brakes at joints of the robotic arm 114 to resist movement of the initial object 142 within the keep-in boundary and/or lock the initial object 142 within the keep-in boundary.

8.4.1 Force Application+Resistance

In one implementation, the system 100 can: detect a series of forces applied to the distal end of the robotic arm 114 such as, applied by an operator to the control handle 118; and apply a manipulation resistance of the initial object 142 within the keep-in boundary that is directly proportional to the series of forces applied to the distal end of the robotic arm 114.

For example, the system 100 can: detect an increase in applied force across the series of forces applied to the distal end of the robotic arm 114; and in response to detecting this increase, increase manipulation resistance (e.g., translational manipulation resistance, rotational manipulation resistance) of the initial object 142 within the keep-in boundary. Alternatively, the system 100 can: detect a decrease in applied force across the series of forces applied to the distal end of the robotic arm 114; and in response to detecting this decrease, decrease manipulation resistance (e.g., translational manipulation resistance, rotational manipulation resistance) of the initial object 142 within the keep-in boundary.

In another example, the system 100 can: define a translational manipulation resistance-directly proportional to the series of forces—for translating the initial object 142 in directions of the series of forces within the keep-in boundary.

Additionally, the system 100 can define defining a rotational manipulation resistance for rotating the initial object 142 in directions of the series of forces within the keep-in boundary. The rotational manipulation resistance can include: a yaw manipulation resistance constrained to one degree of rotation; a roll manipulation resistance constrained to one degree of rotation; and a pitch manipulation resistance directly proportional to the series of forces.

Therefore, the system 100 can prevent sudden movement-such as from forces applied by an operator and/or local wind—of the initial object 142 within the keep-in boundary and retain the initial object 142 entirely within the keep-in boundary.

8.4.2 Location-Based Manipulation Resistance

In one implementation, the system 100 can: track locations of the initial object 142 within the keep-in boundary; and apply a manipulation resistance to the initial object 142—supported at the distal end of the robotic arm 114—associated to a particular location (e.g., a center zone, periphery zone) within the keep-in boundary.

For example, in response to navigating the initial object 142 within a center zone-such as encompassing an install plane of the initial install location—of the keep-in boundary, the system 100 can apply a primary manipulation resistance to initial object 142 to enable the operator to freely maneuver the initial within this center zone. In another example, in response to navigating the initial object 142 proximal the periphery of the keep-in boundary, the system 100 can apply a secondary manipulation resistance
   greater than the primary manipulation resistance—to the robotic arm 114 to prevent the initial object 142 from breaching the periphery of the keep-in boundary and colliding with the adjacent objects at the initial install location.

Therefore, during an installation routine of an initial object 142 to an initial install location, the system 100 can retain the initial object 142 entirely within the keep-in boundary.

9. Subsequent Installation Location

Block 160 of the method S100 recites, following installation of the initial object 142 at the initial install location, autonomously navigating across the non-uniform outdoor terrain to locate the robotic arm 114 and the initial container proximal a secondary install location on the initial structure. Generally, following successful installation of an initial object 142 to a primary install location, the system 100 can repeat the steps as described above to support installation of subsequent objects, from the primary container 140, onto subsequent install locations along a structure 150.

9.1 Object Installation Verification and Tracking

In one implementation, the system 100 can: confirm successful installation of an initial object 142 at an initial install location; and record installation of the initial object 142 at the initial install location in a site plan representing the non-uniform outdoor terrain. For example, the system 100 can: receive a confirmation of successful installation of the initial object 142 at the initial install location, such as from an operator device associated with the operator and/or an interactive display at the attachment assembly 110; access a secondary image from the primary optical sensor 120 defining a field of view intersecting the initial object 142 mounted at the initial install location; detect a tag (e.g., QR code) associated with the initial object 142 in the secondary image; and record a geospatial location corresponding to the tag in the initial installation zone, in a set of installation zones, defined in the site plan.

The system 100 can then repeat the steps described above for each subsequent installation of objects across a set of install locations. Therefore, the system 100 can maintain an audit trail of objects mounted across these installation locations.

9.1 Repeat Offset Distance

In one implementation, following successful installation of the initial object 142 at the initial install location, the system 100 can, as described above: access a secondary image from the primary optical sensor 120 defining a field of view intersecting a secondary install location, adjacent the initial install location, at the structure 150; register a secondary set of install features 152 at the secondary install location based on the secondary image; and calculate a secondary gross install pose proximal the secondary install location defining a secondary target offset between the secondary object 144 and the secondary set of install features 152. In this implementation, the secondary target offset approximates (e.g., within 0.001 inches) the initial target offset in order to mimic successful installation of the initial object 142 at the initial install location.

In this implementation, the system 100 can also calculate a secondary install path to maneuver the secondary object 144 at the secondary gross install pose. Similarly, the secondary install path can approximate (e.g., within 0.001 inches) the initial install path in order to mimic successful installation of the initial object 142 at the initial install location.

The system 100 can then: trigger the robotic arm 114 to retrieve the secondary object 144 from the primary container 140 and maneuver the secondary object 144 along the secondary install path to locate the secondary object 144 at the secondary gross install pose; and define a secondary keep-in boundary, proximal the secondary install location and encompassing the secondary gross install pose, for operating the robotic arm 114 in the manual manipulation mode. Furthermore, in response to detecting forces applied to the distal end of the robotic arm 114, the system 100 can trigger operation of the robotic arm 114 in the manual manipulation mode to permit manual motion control of the secondary object 144 by the operator, during installation of the secondary object 144 to the secondary set of install features 152 at the secondary install location, while supporting the secondary object 144 within the secondary keep-in boundary.

Therefore, the system 100 can execute a secondary installation routine mimicking a previous successful installation routine to support an operator during installation of the secondary object 144 at the secondary install location.

The system 100 can then repeat the steps described above across subsequent install locations across a structure 150 arranged at a non-uniform outdoor terrain.

9.2 Adaptive Offset Distance

In one implementation, during operation of the robotic arm 114 in the manual manipulation mode by the operator, the system 100 can: track an offset distance between the initial object 142 and the initial set of install features 152; and adjust a target offset distance between a secondary object 144 and a secondary set of install features 152 during a subsequent installation of a secondary object 144 to a secondary install location. In this implementation, the system 100 can record a secondary offset distance-different (e.g., greater than, less than) from the initial offset distance-between the initial object 142 and the initial set of install features 152 during operation of the robotic arm 114 in the manual manipulation mode by the operator.

The system 100 can then, as described above, following successful installation of the initial object 142 at the initial install location: access a secondary image from the primary optical sensor 120 defining a field of view intersecting a secondary install location, adjacent the initial install location, at the structure 150; register a secondary set of install features 152 at the secondary install location based on the secondary image; and calculate a secondary gross install pose proximal the secondary install location defining the secondary target offset between the secondary object 144 and the secondary set of install features 152. In this implementation, the secondary target offset approximates (e.g., within 0.001 inches) offset deviation from the initial target offset during operation of the robotic arm 114 in the manual manipulation mode by the operator to maneuver the initial object 142.

In this implementation, the system 100 can also calculate a secondary install path to maneuver the secondary object 144 at the secondary gross install pose. The system 100 can then: trigger the robotic arm 114 to retrieve the secondary object 144 from the primary container 140 and maneuver the secondary object 144 along the secondary install path to locate the secondary object 144 at the secondary gross install pose; and define a secondary keep-in boundary, proximal the secondary install location and encompassing the secondary gross install pose, for operating the robotic arm 114 in the manual manipulation mode. Furthermore, in response to detecting forces applied to the distal end of the robotic arm 114, the system 100 can trigger operation of the robotic arm 114 in the manual manipulation mode to permit manual motion control of the secondary object 144 by the operator, during installation of the secondary object 144 to the secondary set of install features 152 at the secondary install location, while supporting the secondary object 144 within the secondary keep-in boundary.

Therefore, the system 100 can execute a secondary installation routine adjusted from a previous successful installation routine to support an operator during installation of the secondary object 144 at the secondary install location.

9.3 Un-Install

In one implementation, the system 100 can similarly implement the steps and processes described above to: un-install an initial object 142 from an initial install location; and maneuver the initial object 142 from the initial install location to the primary container 140 loaded onto the set of forks 113. In this implementation, the system 100 can: navigate the off-road vehicle about the non-uniform outdoor terrain to locate the robotic system 100 proximal an initial install location including an initial object 142; access a secondary image from the primary optical sensor 120 defining a field of view intersecting the primary container 140; register a set of loading features at the primary container 140 based on the image; calculate a gross install pose proximal the primary container 140 defining a target offset between the initial object 142 and the set of loading features; and calculate an install path to maneuver the initial object 142 at the secondary gross install pose.

The system 100 can then: trigger the robotic arm 114 to retrieve the initial object 142 from the initial install location and maneuver the initial object 142 along the install path to locate the initial object 142 at the gross install pose proximal the primary container 140; and define a keep-in boundary, proximal the primary container 140 and encompassing the gross install pose, for operating the robotic arm 114 in the manual manipulation mode. Accordingly, in response to detecting forces applied to the distal end of the robotic arm 114, the system 100 can trigger operation of the robotic arm 114 in the manual manipulation mode to permit manual motion control of the initial object 142 by an operator, during loading of the initial object 142 onto the primary container 140, while supporting the initial object 142 within the keep-in boundary. The system 100 can then repeat the steps described above to un-install objects from a set of install locations across a non-uniform outdoor terrain.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
at an autonomous off-road vehicle comprising a set of forks and a robotic arm:
autonomously loading a first container, containing a first set of objects, onto the set of forks; and autonomously navigating across a non-uniform outdoor terrain to locate the robotic arm and the first container proximal a first install location on a first structure;

prior to retrieving a first object from the first set of objects in the first container via the robotic arm:
  accessing a first image from a first optical sensor defining a first field of view intersecting the first install location;
  detecting a first set of install features at the first install location based on the first image;
  calculating a first gross install pose of the first object that locates the first object proximal the first install location and offset from the first set of install features by a first target offset distance; and
  calculating a first install path navigable by the robotic arm to retrieve the first object from the first set of objects in the first container and to maneuver the first object to the first gross install pose;

defining a first keep-in boundary of the first object maintained by the robotic arm, the first keep-in boundary proximal the first install location and encompassing the first gross install pose; and at the autonomous off-road vehicle:
  autonomously navigating the robotic arm according to the first install path to retrieve the first object from the first set of objects in the first container and to locate the first object in the first gross install pose;
  following completion of the first install path by the robotic arm:
    entering a manual manipulation mode; and
    in the manual manipulation mode:
      detecting a first series of forces applied to a distal end of the robotic arm; and
      navigating the first object in directions of the first series of forces while supporting a weight of the first object and maintaining the first object fully within the first keep-in boundary; and
  following installation of the first object at the first install location, autonomously navigating across the non-uniform outdoor terrain to locate the robotic arm and the first container proximal a second install location on the first structure.

2. The method of claim 1:
wherein accessing the first image from the first optical sensor comprises accessing the first image from the first optical sensor arranged on the robotic arm and defining the first field of view intersecting the first install location; and
further comprising, subsequent to navigating the robotic arm according to the first install path:
  accessing a second image from a second optical sensor arranged on the autonomous off-road vehicle and defining a second field of view, different from the first field of view, intersecting the first install location;
  deriving a first offset distance between the first object and the first set of install features based on the second image; and
  at the autonomous off-road vehicle:
    in response to the first offset distance deviating from the first target offset distance, autonomously navigating the robotic arm to locate the first object at the first target offset distance from the first set of install features.

3. The method of claim 1:
further comprising, prior to retrieving the first object from the first set of objects in the first container via the robotic arm:
  detecting presence of an operator proximal the first install location at the first structure based on the first image;
wherein calculating the first install path comprises calculating the first install path navigable by the robotic arm to:
  retrieve the first object from the first set of objects in the first container;
  maneuver the first object to the first gross install pose; and
  maneuver a control handle, coupled to an end effector at the distal end of the robotic arm, proximal the operator at the first install location;
wherein autonomously navigating the robotic arm according to the first install path comprises autonomously navigating the robotic arm according to the first install path to:
  retrieve the first object from the first set of objects in the first container;
  locate the first object in the first gross install pose; and
  locate the control handle proximal the operator;
further comprising, subsequent to autonomously navigating the robotic arm according to the first install path:
  entering a stiff manipulation mode; and
  in the stiff manipulation mode, restricting navigation of the first object while supporting the weight of the first object and maintaining the first object fully within the first keep-in boundary; and
wherein entering the manual manipulation mode comprises:
  accessing an initial series of force values from a first force sensor coupled to the control handle; and
  in response to a ramp rate of the initial series of force values falling below a target ramp rate, entering the manual manipulation mode of the robotic arm by releasing joints of the robotic arm.

4. The method of claim 3:
further comprising in the manual manipulation mode, defining a manipulation resistance for the robotic arm within the first keep-in boundary directly proportional to the first series of forces applied to the distal end of the robotic arm;
wherein detecting the first series of forces in the manual manipulation mode comprises detecting the first series of forces applied to the control handle at the distal end of the robotic arm; and
wherein navigating the first object in the manual manipulation mode comprises navigating the first object in directions of the first series of forces according to the manipulation resistance of the robotic arm while supporting the weight of the object and maintaining the first object fully within the first keep-in boundary.

5. The method of claim 3, further comprising:
subsequent to navigating the robotic arm according to the first install path:
  accessing a second image from a second optical sensor arranged on the autonomous off-road vehicle and defining a second field of view, different from the first field of view, intersecting the first install location; and
  deriving a first polarity of the first object based on the second image;

at the autonomous off-road vehicle, in response to the first polarity deviating from a target polarity, autonomously navigating the robotic arm to load the first object into the first container;
calculating a second install path navigable by the robotic arm to:
retrieve the first object from the first set of objects in the first container;
maneuver the first object to the first gross install pose in the target polarity; and
maneuver the control handle proximal the operator at the first install location; and
at the autonomous off-road vehicle, autonomously navigating the robotic arm according to the second install path to:
retrieve the first object from the first container;
locate the first object in the first gross install pose according to the target polarity; and
locate the control handle proximal the operator.

6. The method of claim 1:
further comprising:
accessing a second image from a second optical sensor arranged on the autonomous off-road vehicle and defining a second field of view, different from the first field of view, intersecting the first install location; and
based on the second image:
detecting a second object at a second install location adjacent the first install location; and
deriving an install plane encompassed by the first set of install features at the first install location; and
wherein defining the first keep-in boundary maintained by the robotic arm comprises the first keep-in boundary:
encompassing the first gross install pose;
defining an interstice between a lateral side of the second object at the second install location and a periphery of the first keep-in boundary; and
extending below the install plane at the first install location.

7. The method of claim 6, wherein navigating the first object in the manual manipulation mode comprises:
at a first time, in response to navigating the first object toward the install plane within the first keep-in boundary, applying a first manipulation resistance to the robotic arm to locate the object coplanar with the install plane within the first keep-in boundary; and
at a second time, in response to navigating the first object proximal the periphery of the first keep-in boundary, applying a second manipulation resistance to the robotic arm to prevent the first object from breaching the periphery of the first keep-in boundary and colliding with the second object at the second install location, the second manipulation resistance greater than the first manipulation resistance.

8. The method of claim 1:
wherein autonomously navigating the off-road vehicle across the non-uniform outdoor terrain to locate the robotic arm and the first container proximal the first install location on the first structure comprises autonomously navigating the off-road vehicle across an uneven muddy outdoor terrain to locate the robotic arm proximal the first install location; and
further comprising, at the autonomous off-road vehicle:
detecting a series of wind forces applied to the distal end of the robotic arm proximal the first install location in the non-uniform outdoor terrain;
in response to a ramp rate of the series of wind forces exceeding a threshold ramp rate, entering a stiff manipulation mode; and
in the stiff manipulation mode, restricting navigation of the first object in directions of the series of wind forces while supporting the weight of the first object and maintaining the first object fully within the first keep-in boundary.

9. The method of claim 1, further comprising in the manual manipulation mode:
defining a translational manipulation resistance for translating the first object in directions of the first series of forces within the first keep-in boundary, the translational manipulation resistance directly proportional to the first series of forces; and
defining a rotational manipulation resistance for rotating the first object in directions of the first series of forces within the first keep-in boundary, the rotational manipulation resistance comprising:
a yaw manipulation resistance constrained to one degree of rotation;
a roll manipulation resistance constrained to one degree of rotation; and
a pitch manipulation resistance directly proportional to the first series of forces.

10. The method of claim 1, further comprising at the autonomous off-road vehicle, following completion of the first install path by the robotic arm:
at a first time:
detecting an initial series of forces applied to the distal end of the robotic arm; and
in response to a first ramp rate of the initial series of forces falling below a threshold ramp rate, entering the manual manipulation mode by releasing joints of the robotic arm; and
at a second time following the first time:
detecting a second series of forces applied to the distal end of the robotic arm;
in response to a second ramp rate of the second series of forces exceeding the threshold ramp rate, entering a stiff manipulation mode by locking joints of the robotic arm; and
in the stiff manipulation mode, restricting navigation of the first object while supporting the weight of the first object and maintaining the first object fully within the first keep-in boundary.

11. The method of claim 1:
further comprising at the autonomous off-road vehicle:
prior to loading the first container, autonomously navigating to a loading zone at the non-uniform outdoor terrain;
accessing a second image from a second optical sensor arranged on the autonomous off-road vehicle and defining a second field of view intersecting the first container arranged at the loading zone;
detecting a first set of loading features at the first container based on the second image;
calculating a first loading path navigable by the autonomous off-road vehicle to locate the autonomous off-road vehicle proximal the first container and to couple the set of forks to the first set of loading features; and
wherein autonomously loading the first container comprises, at the autonomous off-road vehicle, autonomously navigating the autonomous off-road vehicle according to the first loading path to load the first container, containing the first set of objects, onto the set of forks; and further comprising, subsequent to loading the first container:
    accessing a site plan representing the non-uniform outdoor terrain and defining a set of installation zones scheduled for installation of objects; and
    identifying a first installation zone, in the set of installation zones, defined in the site plan and currently scheduled for installation of objects;

wherein autonomous navigating across the non-uniform outdoor terrain to locate the robotic arm and the first container proximal the first install location comprises, at the autonomous off-road vehicle, navigating across the non-uniform outdoor terrain to locate the robotic arm and the first container proximal the first install location on the first structure at the first installation zone.

12. The method of claim 1:

further comprising:
    accessing a site plan representing the non-uniform outdoor terrain and defining a set of installation zones scheduled for installation of objects; and
    extracting a first install location identifier from the site plan, the first install location identifier corresponding to the first install location of the first structure arranged at a first installation zone, in the set of installation zones, defined in the site plan;

further comprising:
    subsequent to completion of the first install path by the robotic arm, accessing a second image from a second optical sensor arranged on the autonomous off-road vehicle and defining a second field of view intersecting the first object at the first install location;
    detecting a first tag arranged on the first object in the second image;
    extracting a first object identifier corresponding to the first object from the first tag;
    linking the first object identifier to the first install location identifier; and
    recording the first object identifier and the first install location in the first installation zone, in the set of installation zones, defined in the site plan;
    generating an installation map representing a set of object identifiers and a set of install location identifiers across the first installation zone.

13. The method of claim 1, further comprising:

receiving a confirmation of successful installation of the first object at the first install location;

in response to receiving the confirmation of successful installation and prior to retrieving a second object, in the first set of objects, via the robotic arm:
    accessing a second image from the first optical sensor defining a second field of view intersecting the second install location;
    detecting a second set of install features at the second install location based on the second image;
    calculating a second gross install pose of the first object that locates the second object proximal the second install location and offset from the second set of install features, the second gross install pose approximating the first gross install pose; and
    calculating a second install path navigable by the robotic arm to retrieve the second object from the first set of objects in the first container and to maneuver the second object to the second gross install pose, the second install path approximating the first install path;

defining a second keep-in boundary of the second object maintained by the robotic arm, the second keep-in boundary proximal the second install location and encompassing the second gross install pose, and the second keep-in boundary approximating the first keep-in boundary; and at the autonomous off-road vehicle, autonomously navigating the robotic arm according to the second install path to retrieve the second object from the first set of objects in the first container and to locate the second object in the second gross install pose within the second keep-in boundary.

14. The method of claim 1, further comprising:

in the manual manipulation mode:
    tracking a series of locations of the first object within the first keep-in boundary; and
    detecting navigation of the first object to an offset distance, greater than the first target offset distance, within the first keep-in boundary based on the series of locations;

setting the offset distance as a second target offset distance in place of the first target offset distance;

prior to retrieving a second object, in the first set of objects, via the robotic arm:
    accessing a second image from the first optical sensor defining a second field of view intersecting the second install location;
    detecting a second set of install features at the second install location based on the second image;
    calculating a second gross install pose of the second object that locates the second object proximal the second install location and offset from the second set of install features by the second target offset distance; and
    calculating a second install path navigable by the robotic arm to retrieve the second object from the first set of objects in the first container and to maneuver the second object to the second gross install pose, the second install path different from the first install path;

at the autonomous off-road vehicle, autonomously navigating the robotic arm according to the second install path to retrieve the second object from the first set of objects in the first container and to locate the second object in the second gross install pose within the second keep-in boundary.

15. A method comprising:

at an autonomous off-road vehicle comprising a robotic arm and a first set of objects, autonomously navigating across a non-uniform outdoor terrain to locate the robotic arm and the first set of objects proximal a first install location on a first structure;

accessing a first image from a first optical sensor defining a first field of view intersecting the first install location;

detecting a first set of install features at the first install location based on the first image;

calculating a first gross install pose of the first object that locates a first object proximal the first install location and offset from the first set of install features; and defining a first keep-in boundary of the first object maintained by the robotic arm, the first keep-in boundary proximal the first install location and encompassing the first gross install pose; and at the autonomous off-road vehicle:
  autonomously navigating the robotic arm to retrieve the first object from the first set of objects and to locate the first object in the first gross install pose;
  detecting a first series of forces applied to a distal end of the robotic arm; and
  navigating the first object in directions of the first series of forces while supporting a weight of the first object and maintaining the first object fully within the first keep-in boundary.

16. A system comprising:
an attachment assembly configured to transiently mount to an off-road vehicle and comprising:
  an attachment housing;
  a set of forks extending from the attachment housing; and
  a robotic arm coupled to the attachment housing and configured to retrieve objects from a first set of objects within a first container loaded onto the set of forks;
a first optical sensor defining a first field of view intersecting a first structure arranged at an outdoor environment; and
a controller configured to:
  autonomously navigate the off-road vehicle across a non-uniform outdoor terrain to locate the robotic arm and the first container proximal a first install location on the first structure;
  prior to retrieving the first object from the first set of objects in the first container via the robotic arm:
    access a first image from the first optical sensor defining the field of view intersecting the first install location;
    detect a first set of install features at the first install location based on the first image;
    calculate a first gross install pose of the first object that locates the first object proximal the first install location and offset from the first set of install features by a first target offset distance; and
    calculate a first install path navigable by the robotic arm to retrieve the first object from the first set of objects in the first container and to maneuver the first object to the first gross install pose;
  define a first keep-in boundary of the first object maintained by the robotic arm, the first keep-in boundary proximal the first install location and encompassing the first gross install pose;
  autonomously navigate the robotic arm according to the first install path to retrieve the first object from the first set of objects in the first container and to locate the first object in the first gross install pose;
  detect a first series of forces applied to a distal end of the robotic arm; and
  navigate the first object in directions of the first series of forces while supporting a weight of the first object and maintaining the first object fully within the first keep-in boundary.

17. The system of claim 16:
wherein the first optical sensor is arranged on a distal end of the robotic arm and defines the first field of view intersecting the first install location;
further comprising a second optical sensor arranged on a chassis of the off-road vehicle and defining a second field of view, different from the first field of view, intersecting the first install location;
wherein the controller is configured to:
  access a second image from the second optical sensor;
  derive a first offset distance between the first object and the first set of install features based on the second image; and
  in response to the first offset distance deviating from the first target offset distance, autonomously navigate the robotic arm to locate the first object at the first target offset distance from the first set of install features.

18. The system of claim 17:
wherein the robotic arm comprises:
  an end effector configured to grasp objects from the first set of objects within the first container loaded onto the set of forks;
  a control handle extending from the end effector; and
  a force sensor coupled to the control handle; and
wherein the controller is configured to:
  detect presence of an operator proximal the first install location at the first structure based on the first image;
  calculate the first install path navigable by the robotic arm to:
    retrieve the first object from the first set of objects in the first container;
    maneuver the first object to the first gross install pose; and
    maneuver the control handle proximal the operator at the first install location;
  autonomously navigate the robotic arm according to the first install path to:
    retrieve the first object from the first set of objects in the first container;
    locate the first object in the first gross install pose; and
    locate the control handle proximal the operator;
  accessing a first series of forces values from the force sensor;
  in response to a ramp rate of the first series of forces falling below a target ramp rate, entering a manual manipulation mode of the robotic arm to navigate the first object in directions of the first series of force values applied to the control handle while supporting the weight of the first object and maintaining the first object fully within the first keep-in boundary.

19. The system of claim 17:
further comprising a second optical sensor arranged on a chassis of the off-road vehicle and defining a second field of view, different from the first field of view, intersecting the first install location;
wherein the controller is configured to:
  access a second image from a second optical sensor; and
  based on the second image:
    detect a second object at a second install location adjacent the first install location; and
    derive an install plane encompassed by the first set of install features at the first install location;
wherein defining the first keep-in boundary maintained by the robotic arm comprises the first keep-in boundary:
  encompassing the first gross install pose;
  defining an interstice between a lateral side of the second object at the second install location and a periphery of the first keep-in boundary; and
  extending through the install plane at the first install location.

20. The system of claim 19, wherein the controller is configured to:
at a first time, in response to navigating the first object toward the install plane within the first keep-in boundary, apply a first manipulation resistance to the robotic arm to locate the object coplanar with the install plane within the first keep-in boundary; and at a second time, in response to navigating the first object proximal the periphery of the first keep-in boundary, apply a second manipulation resistance to the robotic arm to prevent the first object from breaching the periphery of the first keep-in boundary and colliding with the second object at the second install location, the second manipulation resistance greater than the first manipulation resistance.

\* \* \* \* \*